United States Patent [19]

Griffith

[11] Patent Number: 5,484,019
[45] Date of Patent: Jan. 16, 1996

[54] METHOD FOR CEMENTING IN A FORMATION SUBJECT TO WATER INFLUX

[75] Inventor: James E. Griffith, Loco, Okla.

[73] Assignee: Halliburton Company, Duncan, Okla.

[21] Appl. No.: 343,058

[22] Filed: Nov. 21, 1994

[51] Int. Cl.⁶ .................................................. E21B 33/14
[52] U.S. Cl. .......................... 166/293; 106/719; 166/309
[58] Field of Search ...................... 166/285, 290, 166/292, 293, 309; 106/719, 725, 727, 728

[56] References Cited

U.S. PATENT DOCUMENTS

| | | | |
|---|---|---|---|
| 4,304,298 | 12/1981 | Sutton | 166/293 |
| 4,761,183 | 8/1988 | Clarke | 106/624 |
| 5,125,455 | 6/1992 | Harris et al. | 166/292 |
| 5,147,565 | 9/1992 | Bour et al. | 166/293 X |
| 5,383,521 | 1/1995 | Onan et al. | 166/293 |

*Primary Examiner*—George A. Suchfield
*Attorney, Agent, or Firm*—Craig W. Roddy; Robert A. Kent

[57] ABSTRACT

A method is presented for cementing conductor pipes in well bores in water depths greater than 1000 feet. The method is accomplished by formulating the cement slurry from Portland cement, a foaming surfactant, a quantity of fine particle size cementitious material and nitrogen or other gas to foam the slurry to yield a density of from about 9.0 to about 14 lbs/gal. The slurry is introduced down the conductor pipe and permitted to return up the annulus of the well bore to the seafloor. The slurry develops a static gel strength in excess of about 500 lbf/100 ft² within less than about 30 minutes after placement.

18 Claims, 1 Drawing Sheet

METHOD FOR CEMENTING IN A FORMATION SUBJECT TO WATER INFLUX

BACKGROUND OF THE INVENTION

1. Field of the Invention

This invention relates to a method of cementing a conductor pipe in offshore operations and particularly to methods for use in wells in water over 1000 feet deep where the surface mud is not well consolidated.

2. Description of the Prior Art

Well completions in water over 1000 feet deep often require special techniques to install conductor casing. Well completions at depths in excess of 2000 feet of water are often referred to as "deepwater" operations. In deepwater operations, the formations where conductor pipe is cemented that is less than 2000 feet below mud line (BML) are generally young geologically and are not well consolidated. The formations generally are the product of erosion from the continental shelf. This can cause either of two problems in cementing. The formation may be so weak that it may fracture during cementing and cause the loss of cement into the formation. Alternatively, the formation may experience high saltwater or other fluid flow through the formation resulting in fluid influx.

In a typical conductor pipe installation, a 24–30 OD inch surface pipe is driven at least 200 feet BML. A large diameter (20 in. OD when 30 in. OD used) conductor pipe then is cemented by the conventional innerstring method through the drill pipe, with cement returns back to the ocean floor. Since no riser is used, the annular returns must be taken at the sea floor. Cool temperatures caused by the seawater typically slow the cement hydration process and extend the transition time of the cement slurry which allows fluid influx to begin. The term "transition time" refers to the period of time between the onset of hydration of the cement and the development of compressive strength wherein the gel strength increases to a level of about 500 lbf/100 ft$^2$ whereby fluid migration is substantially prevented. During the transition time, a fluid such as oil, gas or water can migrate through the setting cement slurry forming channels that effect the integrity of the cement sheath. The fluid migration is possible during transition because the cement column in the well bore begins to support itself and stops exerting hydrostatic pressure on the fluid surrounding the well bore. When the exerted hydrostatic pressure falls below the formation fluid pressure, migration can occur and will continue until the cement develops sufficient compressive strength to prevent further migration.

In some instances, the formation sands may be over-pressured by water so that water or other formation fluids flows into the setting cement sheath during the transition time. Prevention of such flow is critical to a successful cementing job and to avoid expensive remedial squeeze cementing treatments. Containment of the over-pressured formation fluid often is complicated by weak zones in the formation that can fracture due to the fluid pressure of the cement slurry. If a fracture is formed, the cement slurry can flow into the fracture and be lost from the well bore.

One method that has been utilized in the past has involved lightening the cement slurry by the addition of mix water. Such slurries have little useful strength at slurry densities below 11 lb/gal and have long transition times because of the cool formation temperatures. Water-extending a cement slurry as accomplished by the addition of water and an extending material such as sodium silicate or bentonire to the normal cement slurry. The amount of water-extending material and water added to the normal weight cement slurry depends on the final desired cement slurry density and the requirement of little or no free water in the cement slurry.

The use of water-extended cement slurries in deepwater completions has resulted in numerous well problems due to the cemented annulus being highly contaminated by formation fluids whereby the cement sheath can not adequately support the conductor string. This can result in casing buckling and loss of the well.

It would be desirable to provide a method by which a cementing operation can be performed on a conductor casing in over-pressured, poorly consolidated formations.

It would be desirable to shorten the transition time of the cement while making the drilling mud and cement slurry weight compatible with the formation fracture gradients to avoid cement losses to the formation.

SUMMARY OF THE INVENTION

The present invention provides a method of cementing conductor casing in subsea formations below a water depth of 1000 feet without undesired fluid influx into the cement slurry. The method is accomplished by formulating the cement slurry from a standard portland-type hydraulic cement, a foaming agent, a quantity of ultrafine hydraulic cement and sufficient nitrogen or other gas to foam the cement slurry to yield a density of from about 9.0 to about 14 lbs/gal. The slurry then is introduced down through the conductor casing and permitted to return up the annulus of the well bore to the sea floor. The cement slurry is formulated to provide a transition time of from about 30 minutes or less at the temperature of the sea floor. The presence of the nitrogen or other gas in the slurry aids in controlling the slurry density and facilitates maintenance of the pressure gradient in the well bore during the transition time of the cement below the fracture gradient.

DESCRIPTION OF THE PREFERRED EMBODIMENT

The present invention provides a method for successfully cementing conductor pipe in offshore operations in water depths in excess of 1000 feet and where the mud and near sea floor formations are poorly consolidated or unstable.

Figure 1:
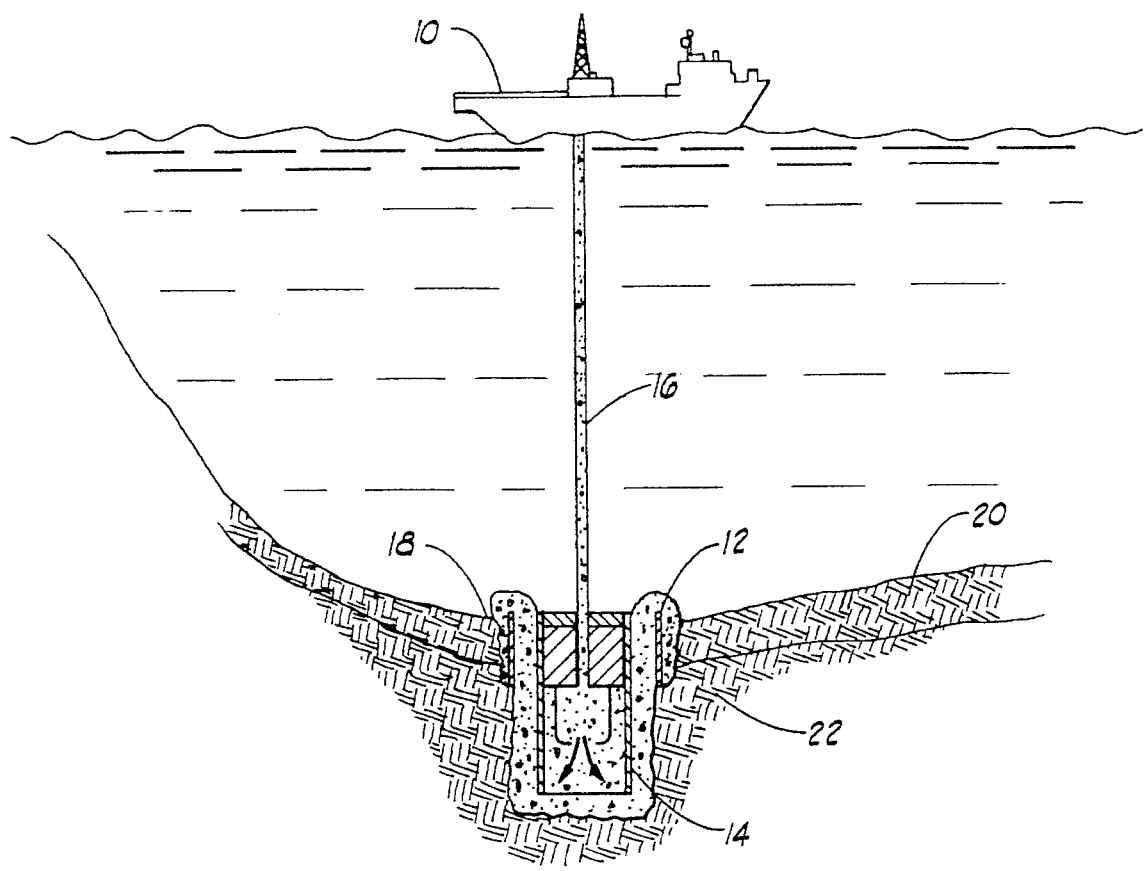
FIG. 1 is a diagrammatic schematic illustration of deepwater cementing in soft formations beyond the continental shelf.
Figure 2:
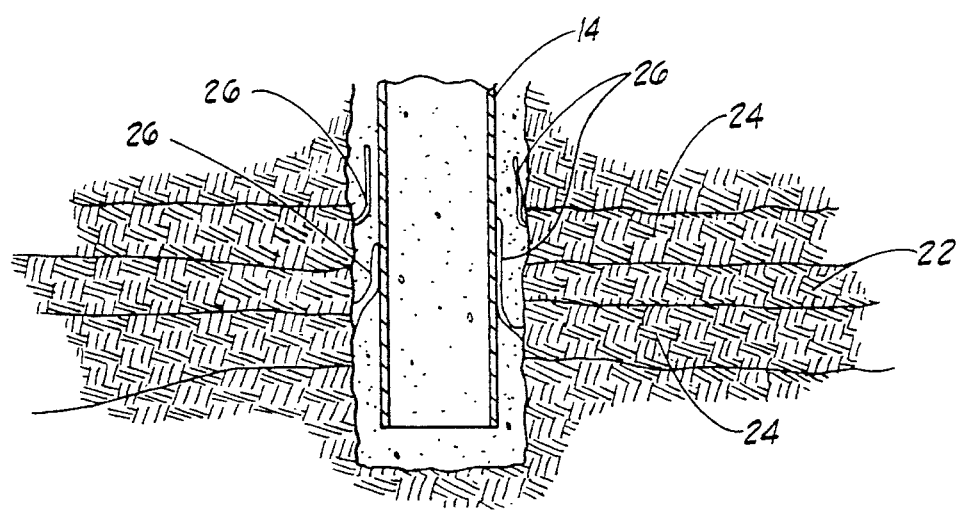
FIG. 2 is a schematic illustration of a portion of a conductor casing cemented in a soft formation subject to water influx.

FIG. 1 provides a diagrammatic illustration of the cementing of a deepwater well in accordance with the prior art techniques described hereinbefore. A drilling platform 10 has positioned a surface pipe 12 through the mudline layer 20 and a conductor pipe 14 into the formation 22 in the seafloor. A conventional cement slurry is pumped through a string 16 and associated packers into the conductor pipe 14 and cement returns are taken at the seafloor 18. FIG. 2 provides a diagrammatic illustration of the problem created by the influx of undesired fluid into the cement slurry during the transition time of the cement slurry. The flow of water or other fluid into the slurry from water zones 24 in formation 22 creates undesired passages 26 in the cement which effects the integrity of the cement bond with the conductor pipe.

The method of the present invention prevents the undesired influx of fluid into the well bore. In accordance with the method of the present invention, the conductor casing is positioned within the well bore and the drilling mud present in the well bore is displaced and substantially removed from the face of the well bore by circulation of a spacer fluid. Such fluids are well known to those individuals skilled in the art of cementing well bores in subterranean formations, therefore no specific method of formulation of such a fluid is considered necessary.

In a preferred embodiment, the drilling mud utilized would have the following general properties: API fluid loss of less than about 7 cc/30 minutes, a yield point of about 20 lbf/100 ft$^2$, a plastic viscosity of about 15 cp and a generally flat gel strength development over time. The drilling fluid preferably is displaced with turbulent flow of a conventional high viscosity spacer fluid. Preferably the spacer fluid has a minimum of 10 minutes contact time with the drilling mud filter cake in the well bore.

The cement slurry of the present inventions then is introduced into the conductor pipe. The conductor pipe is generally of a length of from about 500 to about 2500 feet when utilized in deepwater completions. The slurry is introduced in sufficient volume to fill the annulus from the base of the well bore to the surface of the sea floor. Generally, a volume of 1.2 to 1.5 times the estimated annular volume will be utilized to assure sufficient return to the sea floor. The slurry comprises a quantity of hydraulic cement such as, for example, Portland class A, C, G or H. The average particle size of such cement is typically in excess of 80 microns. The particle size of the cement can also be indirectly expressed in terms of surface area per unit weight of a given sample of material. This value, sometimes referred to as the Blaine Fineness or as specific surface area, can be expressed in the units square centimeters per gram (cm$^2$/gm). The Blaine Fineness of conventional hydraulic cement is less than about 3900 cm$^2$/gm. To the conventional hydraulic cement is added from about 1 to about 30 percent by weight of conventional cement of a cementitious material having particle diameters no larger than about 30 microns, preferably no larger than about 17 microns, and still more preferably no larger than about 11 microns. The distribution of various sized particles within the cementitious material, i.e., the particle size distribution, features 90 percent of them having a diameter not greater than about 25 microns, preferably about 10 microns and still more preferably about 7 microns. Fifty (50) percent having a diameter not greater than about 10 microns, preferably about 6 microns and still more preferably about 4 microns and 20 percent of the particles having a diameter not greater than about 5 microns preferably about 3 microns and still more preferably about 2 microns.

The Blaine Fineness of the fine particle size cementitious material used in the cementing methods of this invention is no less than about 6000 cm$^2$/gram. The value is preferably greater than about 7000, more preferably about 10,000, and still more preferably greater than about 13,000 cm$^2$/gram.

Cementitious materials of particle size and fineness as set out above are disclosed in various prior U.S. Pat. Nos. including Clark, U.S. Pat. No. 4,761,183, which is drawn to slag, as defined herein, and mixtures thereof with ultrafine Portland cement, and Sawyer, U.S. Pat. No. 4,160,674, which also is drawn to Portland cement. The fine particle size cementitious materials preferred for use in this invention are ultrafine Portland cement and combinations thereof with slag wherein the quantity of Portland cement included in any mixture of Portland cement and slag used in the methods of this invention can be as low as 10 percent but is preferably no less than about 40 percent, more preferably about 80 percent and most preferably no less than about 100 percent Portland cement by weight of mixture. The fine particle size cementitious material is more fully described in U.S. Pat. No. 5,125,455, the entire disclosure of which is incorporated by reference herein.

The cementitious material is formulated into an aqueous slurry by admixture with an aqueous fluid such as fresh water, seawater or substantially any other aqueous fluid. The slurry may be formulated utilizing ratios of the weight of water per unit weight of conventional cement material in the range of a from about 0.4 to about 0.85 and preferably from about 0.55 to about 0.65 pounds per pound of conventional cement material.

When fresh water is utilized to formulate the slurry, a foaming surfactant such as an anionic ethoxylated $C_8$-$C_{15}$ linear alcohol sulfonate may be admixed with the slurry together with a stabilizer such as, for example, a capped polyethylene oxide such as "CARBO WAX" foam stabilizer, a product of Union Carbide. The surfactant may be present in an amount of from about 1 to about 10 percent by volume of water utilized in the slurry preferably from about 1 to about 5 percent by volume of water and most preferably about 3 percent by volume of water. The stabilizer may be present in an amount of from about 0.25 to about 2 percent by volume of water utilized in the slurry and preferably about 0.75 percent by volume of water.

Alternatively, any other known surfactant or surfactant and stabilizer which will function to form a stable foam in cement/fresh water slurries may be utilized.

When seawater is utilized to formulate the slurry a foaming surfactant such as an amphoteric fatty amine such as a betaine of coco-amine may be admixed with the slurry and a stabilizer such as, for example, a salt of an alkyl ether sulfate may be included. The surfactant and stabilizer may be present in the same ranges as for fresh water. Preferably, the surfactant is present in the seawater slurry in an amount of from about 3 to 4 percent by volume of seawater and the stabilizer is present in an amount of about 0.75 percent by volume of seawater.

Alternatively any other surfactant or surfactant/stabilizer mixture may be employed which is capable of stabilizing the foamed cement slurry.

The slurry is foamed by the addition of nitrogen or other gas to the mixture of cement, aqueous fluid, surfactant and stabilizer. The density of the slurry may be controlled by the amount of nitrogen gas admixed with the slurry. The slurry density can be adjusted to any desired level within a range of from about 9 to about 14 pounds per gallon by the addition of from about 300 to as little as 100 standard cubic feet (SCF) of nitrogen gas at standard conditions per barrel of unfoamed cement slurry. The specific density of the cement slurry will depend upon several factors, however, it is important to maintain the density at a level such that the fracturing gradient of the near surface formation in which the conductor pipe is being cemented is not exceeded. Generally, the density will be adjusted to provide a level slightly above the formation pressure but below the fracturing gradient to maintain control over the slurry and prevent fluid influx during the transition time of the cement slurry. Preferably, the density will be adjusted to a level of about 1 lb/gal above the density required to match the formation pressure in the well bore.

The cement slurry also may contain other conventional additives such a accelerators, fluid-loss control agents, additives to control free water or solids separation and the like, silica fume, glass or ceramic micropheres, perlite and the like.

The slurry upon placement in the well bore rapidly develops sufficient compressive strength to prevent the influx of formation fluids before loss of the hydrostatic pressure control effected by the nitrogen or gas foam during the transition time when the slurry is static. The slurry develops a gel strength (yield point) in excess of about 500 lbf/100 ft$^2$ within about 30 minutes of the time of placement which substantially prevents fluid migration through the cement sheath in the well bore. This is in contrast to conventional cement slurries which may take 3 to 6 hours or more to develop a similar yield point and which permit fluid influx as a result.

To further illustrate the present invention, while not intended or considered to limit the present invention, the following examples is provided.

A well bore is completed in the Gulf of Mexico in 2700 feet of water. A 20 inch conductor pipe is positioned in a 26 inch well bore. The length of the conductor pipe is 1800 feet. The cement slurry is designed to provide a 25% volumetric excess to ensure return to the seafloor. The slurry is comprised of 1620 sacks of class A Portland cement, 122081 SCF of nitrogen gas, 27450 pounds of fine particle size cementitious material, 1900 pounds of calcium chloride, 380 gallons of a surfactant comprising a betaine of a coco-amine, and 96 gallons of an alkyl ether sulfate stabilizer. The aqueous fluid admixed with the cement to form the slurry is seawater and the seawater is admixed with the cement in an amount of 6.8 gallons per sack of conventional Portland cement. The fluid is pumped through drill pipe to the conductor casing and permitted to return up the annulus to the seafloor. The cement exhibited a transition time of less than 30 minutes and no formation fluid influx is found to occur.

While that which is considered to be the preferred embodiment of the present invention has been described herein, it is to be understood that other embodiments have been suggested and still others will occur to those skilled in the art upon a reading and understanding of the foregoing specification. It is intended that all such embodiments be included within the scope of this invention as limited only by the appended claims.

What is claimed is:

1. A method for cementing a conductor pipe in a well bore in a seafloor in a water depth over 1000 feet comprising:
   preparing a cementing slurry comprising a Portland cement having a Blaine Fineness less than about 3900 cm$^2$/gm, from about 1 to about 30 percent by weight of said Portland cement of a fine particle size cementitious material having a Blaine Fineness of no less than about 6000 cm$^2$/gm and a particle size no greater than about 30 microns, from about 0.4 to about 0.85 pounds of aqueous fluid per pound of said Portland cement, from about 1 to about 10 percent by volume of aqueous fluid of a foaming surfactant and sufficient nitrogen gas to foam said slurry;
   introducing said slurry into said conductor pipe whereby it is caused to flow through said pipe and return from the lower end thereof through an annulus present between said pipe and said well bore to the surface of said seafloor; and
   maintaining said slurry in said annulus for a sufficient time to enable said slurry to form a rigid cement sheath whereby influx of fluids into said well bore is prevented.

2. The method of claim 1 wherein said nitrogen gas is admixed with said cement slurry in an amount sufficient to provide a slurry with a density in the range of from about 9 to about 14 pounds per gallon.

3. The method of claim 1 wherein said nitrogen gas is admixed with said cement slurry in an amount of from about 100 to about 300 SCF per barrel of unfoamed cement slurry.

4. The method of claim 1 wherein said slurry develops a yield point in excess of 500 lb/100 ft$^2$ in said annulus in less than about 30 minutes.

5. The method of claim 1 wherein said surfactant is present in an amount of from about 1 to about 5 percent by volume of aqueous fluid.

6. The method of claim 1 defined further to include in said cement slurry a foam stabilizer present in an amount of from about 0.25 to about 2 percent by volume of aqueous fluid.

7. The method of claim 6 wherein said stabilizer comprises at least one member selected from the group of a capped polyethylene oxide and a salt of an alkyl ether sulfate.

8. The method of claim 1 wherein said foaming surfactant comprises at least one member selected from the group of amphoteric fatty amines and anionic ethoxylated $C_8$–$C_{15}$ linear alcohol sulfonates.

9. The method of claim 1 wherein the maximum particle size of said fine cementitious material is about 11 microns and the Blaine Fineness is no less than about 10,000 cm$^2$/gm.

10. The method of claim 1 wherein said cement slurry is defined further to include an accelerator comprising calcium chloride.

11. A method of cementing conductor pipe in a well bore wherein said pipe is situated in said well bore penetrating a subterranean formation so as to define an annular space between said pipe and the wall of said well bore and said well bore is drilled from a seafloor at a water depth of at least 1000 ft comprising:
    introducing sufficient volume of a cement slurry through said conductor pipe whereby said slurry is caused to flow from the lower end of said conductor pipe upwardly through said annular space to fill said annular space; and
    maintaining said slurry in said annular space for a sufficient time to enable said slurry to develop a yield point in excess of about 500 lbf/100 ft$^2$ whereby fluid influx from said subterranean formation is substantially prevented,
    wherein said slurry consists essentially of a quantity of Portland cement having a Blaine Fineness less than about 3900 cm$^2$/gm, from about 1 to about 30 percent by weight of said Portland cement of a fine particle size cementitious material having a Blaine Fineness no less than about 6000 cm$^2$/gm and a particle size no greater than about 30 microns, from about 0.4 to about 0.85 pounds of aqueous fluid per pound of said Portland cement, from about 1 to about 10 percent by volume of aqueous fluid of a foaming surfactant and sufficient gas to foam said slurry.

12. The method of claim 11 wherein said gas is selected from air and nitrogen gas.

13. The method of claim 12 wherein said nitrogen gas is admixed with said cement slurry in an amount of from about 100 to about 300 SCF per barrel of unfoamed cement slurry.

14. The method of claim 11 wherein said surfactant is present in an amount of from about 1 to about 5 percent by volume of said aqueous fluid.

15. The method of claim 11 defined further to include in said cement slurry a foam stabilizer present in an amount of from about 0.25 to about 2 percent by volume of aqueous fluid.

16. The method of claim 15 wherein said stabilizer comprises at least one member selected from the group of a capped polyethylene oxide and a salt of an alkyl ether sulfate.

17. The method of claim 11 wherein said foaming surfactant comprises at least one member selected from the group of amphoteric fatty amines and anionic ethoxylated $C_8$–$C_5$ linear alcohol sulfonates.

18. The method of claim 11 wherein the maximum particle size of said fine cementitious material is about 11 microns and the Blaine Fineness is no less than about 10,000 $cm^2/gm$.

* * * * *